US012735988B2

(12) United States Patent
Tsassis et al.

(10) Patent No.: US 12,735,988 B2
(45) Date of Patent: Sep. 15, 2026

(54) SECTOR OF A TURBINE STATOR FOR A TURBINE OF AN AIRCRAFT TURBOMACHINE

(71) Applicant: SAFRAN AIRCRAFT ENGINES, Paris (FR)

(72) Inventors: Thomas Tsassis, Moissy-Cramayel (FR); Josserand Jacques André Bassery, Moissy-Cramayel (FR); Samuel Laurent Noël Mathieu Juge, Moissy-Cramayel (FR); Ba-Phuc Tang, Moissy-Cramayel (FR); Elsa Maxime, Moissy-Cramayel (FR); Arthur De Castro, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 19/111,861

(22) PCT Filed: Sep. 8, 2023

(86) PCT No.: PCT/FR2023/051347

§ 371 (c)(1),
(2) Date: Mar. 14, 2025

(87) PCT Pub. No.: WO2024/056961

PCT Pub. Date: Mar. 21, 2024

(65) Prior Publication Data

US 2026/0085615 A1 Mar. 26, 2026

(30) Foreign Application Priority Data

Sep. 15, 2022 (FR) ....................................... 2209315

(51) Int. Cl.
*F01D 9/04* (2006.01)
*F01D 17/16* (2006.01)

(52) U.S. Cl.
CPC ........... *F01D 9/041* (2013.01); *F01D 17/162* (2013.01); *F05D 2240/128* (2013.01)

(58) Field of Classification Search
None
See application file for complete search history.

(56) References Cited

U.S. PATENT DOCUMENTS 7,625,170 B2 * 12/2009 Greene ..................... F01D 5/30 415/110
9,273,565 B2 * 3/2016 Propheter-Hinckley ..................... F01D 9/041

(Continued)

FOREIGN PATENT DOCUMENTS

EP 2738356 A1 6/2014
JP S59185803 A 10/1984
WO 2015061152 A1 4/2015

OTHER PUBLICATIONS

International Search Report mailed Nov. 3, 2023, issued in corresponding International Application No. PCT/FR2023/051347, filed Sep. 8, 2023, 5 pages.

(Continued)

*Primary Examiner* — Juan G Flores
(74) *Attorney, Agent, or Firm* — Christensen O'Connor Johnson Kindness PLLC

(57) ABSTRACT

A sector of a turbine stator for a turbine of an aircraft turbomachine, the sector having an outer platform and an inner platform which are coaxial along an axis. The sector further includes at least one blade which connects the outer and inner platforms together, with the blade being variable-pitch about an axis of rotation of the blade. The blade can include an aerodynamic body delimited radially by a head and a root, the head being placed with a first functional clearance in an opening of the outer platform, the root being placed with a second functional clearance in a cavity of the (Continued)

inner platform, the axis of rotation of the blade being located downstream of the head and the root.

12 Claims, 10 Drawing Sheets

(56) References Cited

U.S. PATENT DOCUMENTS

| | | | | |
|---|---|---|---|---|
| 9,803,486 | B2 * | 10/2017 | Freeman | F01D 5/189 |
| 10,190,426 | B2 * | 1/2019 | Fremont | F01D 9/042 |
| 2009/0067978 | A1 | 3/2009 | Suljak, Jr. | |
| 2009/0232644 | A1 * | 9/2009 | Greene | F01D 5/147 415/177 |
| 2013/0216361 | A1 * | 8/2013 | Propheter-Hinckley | F01D 9/041 29/889.21 |
| 2015/0016972 | A1 * | 1/2015 | Freeman | C04B 37/005 415/177 |
| 2017/0074110 | A1 * | 3/2017 | Fremont | F01D 25/005 |

OTHER PUBLICATIONS

Written Opinion mailed Nov. 3, 2023, issued in corresponding International Application No. PCT/FR2023/051347, filed Sep. 8, 2023, 8 pages.

* cited by examiner

SECTOR OF A TURBINE STATOR FOR A TURBINE OF AN AIRCRAFT TURBOMACHINE

CROSS-REFERENCE TO RELATED APPLICATIONS

This application is a National Stage of International Application No. PCT/FR2023/051347, filed Sep. 8, 2023, which claims priority to French Patent Application No. 2209315, filed Sep. 15, 2022, the entire disclosures of which are hereby incorporated by reference in their entirety for all purposes.

TECHNICAL SCOPE OF THE INVENTION

The present invention relates to a sector of a turbine stator for a turbine of an aircraft turbomachine, and more generally to a turbine stator comprising such sectors.

TECHNICAL BACKGROUND

Typically, a turbomachine turbine includes at least one stage comprising a fixed turbine stator comprising vanes and a mobile wheel comprising vanes.

More specifically, the turbine stator comprises an outer ring and an inner ring which are coaxial along an axis X, the outer and inner rings being connected to each other by an annular row of blades. Such a turbine stator is usually sectorized and comprises an annular row of sectors placed end-to-end around the axis X, each sector comprising, for example, two or three fixed pitch blades.

Sectorization of the turbine stator necessarily implies the presence of a misalignment, however small, between the sectors around the axis X. This misalignment can be observed, for example, by the presence of steps between two successive sectors at the rings.

Such misalignment implies that the passage section of the turbine stator is not homogeneous around the axis X, to the detriment of the turbomachine's efficiency. In addition, the steps created by this misalignment generate disturbances within the flow, which also have a negative impact on the efficiency of the turbomachine.

To correct or minimize this misalignment, various machining operations can be carried out once the turbine stator have been mounted.

However, such operations are complex to carry out and considerably increase the manufacturing time of the turbine stator, to the detriment of productivity. It should be noted that the above machining operations are only permitted during the manufacture of the motor, in other words before it is put into service.

In addition, engine manufacturers note that the optimum passage section depends on many parameters (e.g. external environment, number of hours the engine has been running, etc.), and that it would be beneficial to be able to adjust this passage section throughout the life of the engine, which is not currently possible.

The aim of the present invention is therefore to provide a simple, effective and economical solution to at least some of the above problems.

The prior art also includes document US2009/067978A1.

SUMMARY OF THE INVENTION

The invention thus proposes a sector of a turbine stator for a turbine of an aircraft turbomachine, the sector comprising an outer platform and an inner platform which are coaxial along an axis X, the sector further comprising at least one blade which connects the outer and inner platforms together, characterized in that the blade is of variable pitch about an axis of rotation Y of the blade, the blade comprising an aerodynamic body delimited radially by a head and a root, the head being placed with a first functional clearance in an opening of the outer platform, the root being placed with a second functional clearance in a cavity of the inner platform, the axis of rotation Y of the blade being located downstream of the head and the root.

By fitting variable pitch blades to the turbine stator, the passage section of the turbine stator can be adjusted by adjusting the pitch of the individual blades.

This type of adjustment enables the homogenization of the passage section of the turbine stator, to the benefit of the turbine's efficiency and, more generally, that of the turbomachine.

This adjustment can be made at any time during the life of the motor, for example when the motor is fitted or when the motor is serviced.

Positioning the axis of rotation Y in this way generally optimizes the passage section of the turbine stator.

The sector according to the invention may comprise one or more of the following features, taken in isolation from each other or in combination with one another:

- the blade is guided in rotation about its axis of rotation Y via a cylindrical portion of the blade which is inserted in an orifice in the outer platform and a spherical portion of the blade which is inserted in a housing in the inner platform;
- the pitch of the blade is adjusted via a control element which is integral with the blade and which is disposed outside the outer platform, the control element being guided by a guide device placed between the control element and the outer platform;
- the control element is attached to an outer face of the head of the blade;
- the guide device comprises an armature in which bearing balls and/or a self-lubricating pad are housed;
- the root of the blade is held radially in the cavity by a plurality of pins, each pin being partly housed in a hole in the root and partly housed in a groove in the cavity;
- the sector comprises several blades, each of which connects the outer and inner platforms, each of the blades being of variable pitch about its axis of rotation Y.

The present invention also relates to a turbine stator for a turbine of an aircraft turbomachine, the turbine stator comprising a plurality of sectors as previously described, the sectors being placed end-to-end about the axis X.

The invention further relates to a turbine of an aircraft turbomachine comprising a turbine stator as described above.

The present invention furthermore relates to an aircraft turbomachine comprising a turbine stator as described above or a turbine as described above.

Finally, the present invention relates to a method of mounting or maintaining a turbine stator as described above, the method comprising at least the step of:

a1) adjusting the pitch of the blades of the sector so as to homogenize the passage section of the turbine stator which is defined between the outer and inner platforms of the sectors.

BRIEF DESCRIPTION OF THE FIGURES

The invention will be better understood and other details, characteristics and advantages of the invention will become clearer on reading the following description made by way of non-limiting example and with reference to the annexed drawings in which.

DETAILED DESCRIPTION OF THE INVENTION

Figure 1:
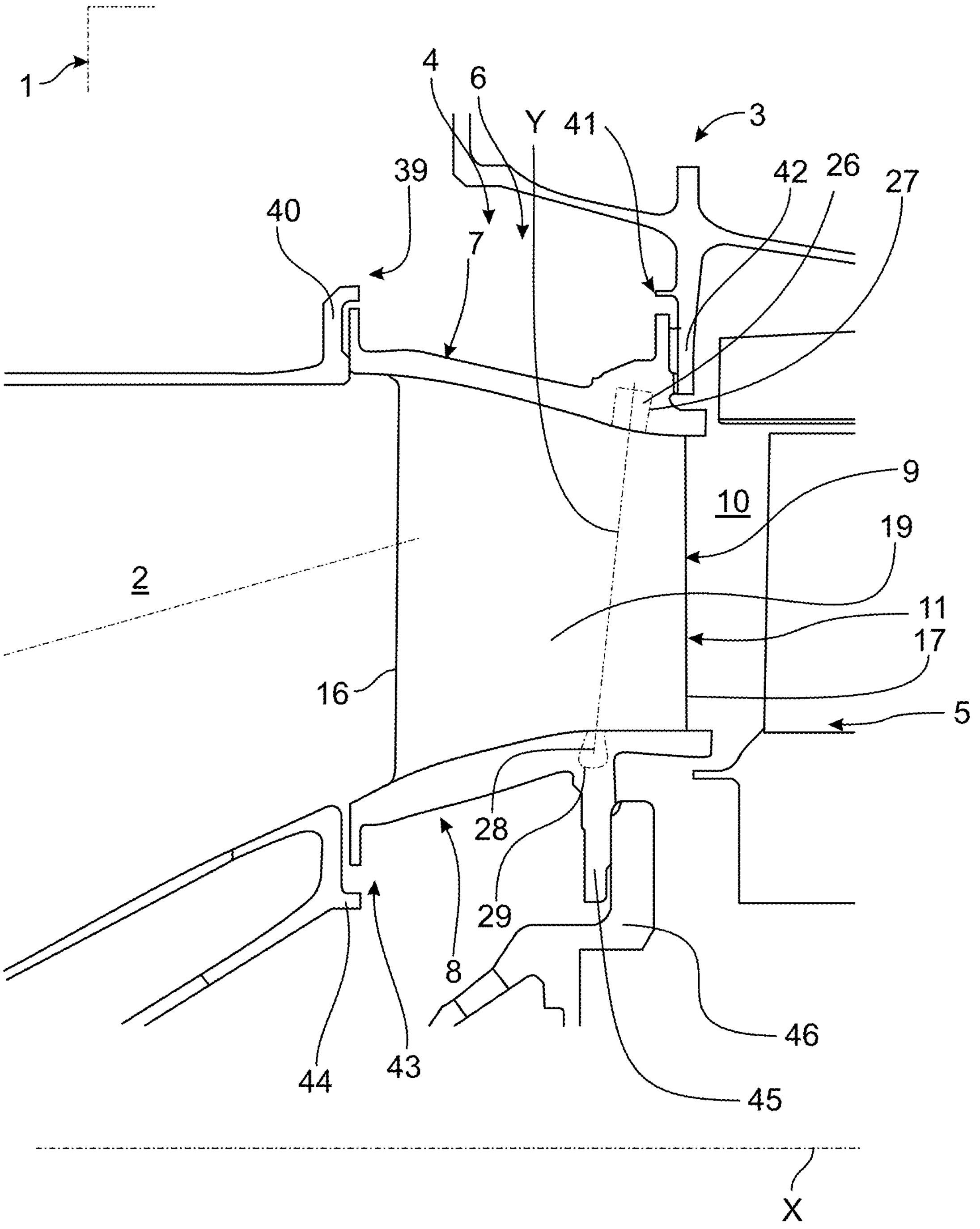
FIG. 1 is a partial axial half-section view of a turbomachine comprising a turbine stator according to the invention.
Figure 2:
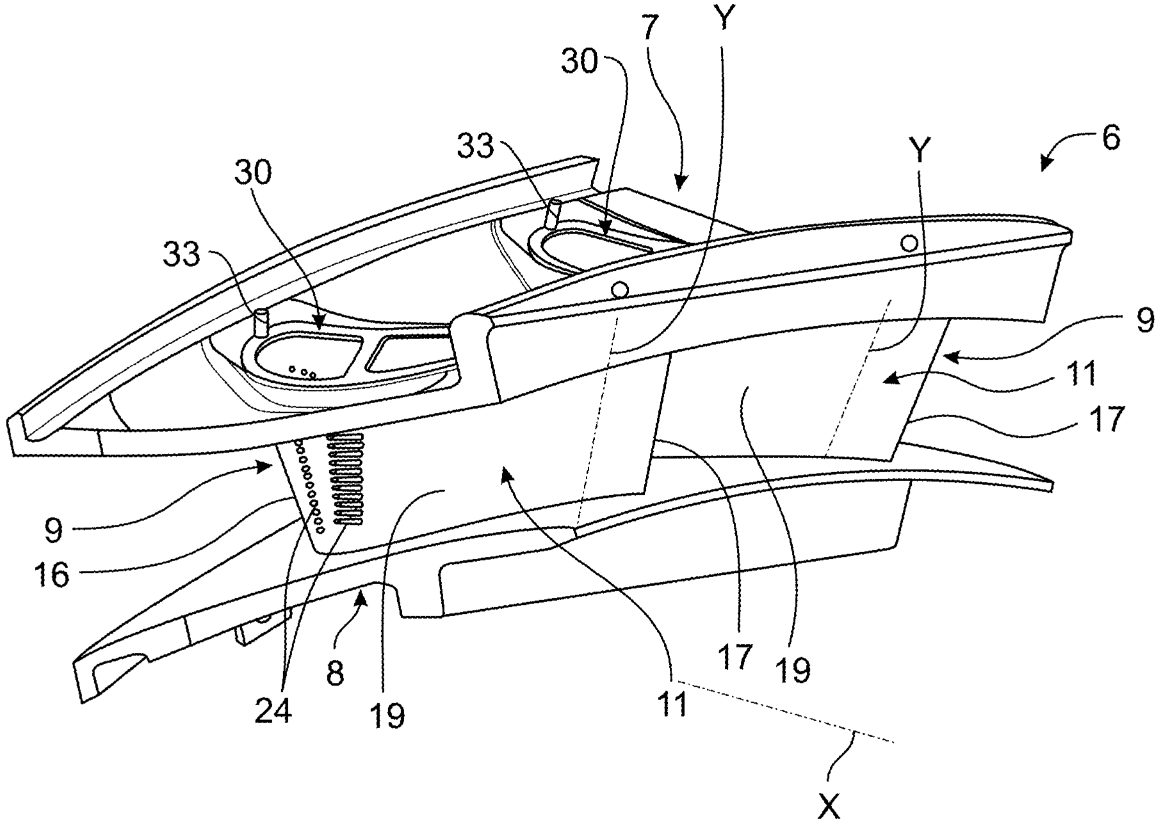
FIG. 2 is a detailed perspective view of a sector of the turbine stator illustrated in FIG. 1.
Figure 3:
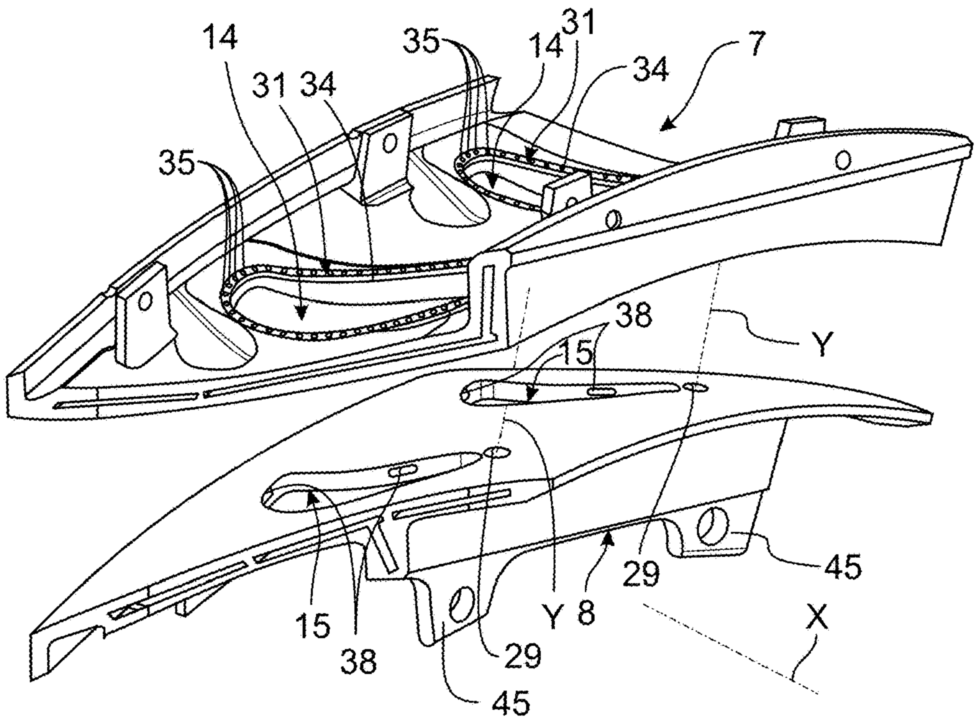
FIG. 3 is a detailed perspective view of the outer and inner platforms of the sector illustrated in FIG. 2.

FIG. 1 shows part of an aircraft turbomachine 1, the turbomachine 1 being, for example, a turbojet engine, a turboprop engine or a turboshaft engine.

The turbomachine 1 typically comprises, from upstream to downstream in the direction of gas flow, at least one compressor, a combustion chamber 2 and at least one turbine 3.

In the embodiment illustrated in FIG. 1, the turbomachine 1 comprises a high-pressure turbine 3 arranged directly downstream of the combustion chamber 2 and a low-pressure turbine (not shown) arranged downstream of the high-pressure turbine 3. The high-pressure turbine 3 comprises a single high-pressure stage including a turbine stator 4 and a mobile wheel 5. The turbine stator 4 is located directly downstream of the combustion chamber 2 and the wheel 5 is located directly downstream of the turbine stator 4. The wheel 5 can rotate about a longitudinal axis X of the turbomachine 1.

The turbine stator 4 is annular and sectorized, and thus comprises a plurality of sectors 6 placed end-to-end around the axis X. The turbine stator 4 and the sectors 6 of the turbine stator 4 are also defined along the axis X. Each sector 6 comprises an outer platform 7 and an inner platform 8 that are coaxial along the axis X. The sector 6 also comprises at least one blade 9 which connects the outer and inner platforms 7, 8 together.

According to the invention, said at least one blade 9 of the sector 6 is at a variable pitch about an axis of rotation Y of the blade 9. The blade 9 comprises a body 11 aerodynamic delimited radially by a head 12 and a root 13. The head 12 is placed with a first functional clearance in an opening 14 of the outer platform 7. The root 13 is placed with a second functional clearance in a cavity 15 of the inner platform 8. The axis of rotation Y of blade 9 is located downstream of the head 12 and the root 13.

A sector 6 may of course comprise several blades 9 (for example two or three), each of which connects the outer and inner platforms 7, 8, each of the blades 9 being at a variable pitch about its axis of rotation Y.

By fitting variable pitch blades to the turbine stator, the passage section of the turbine stator can be adjusted by adjusting the pitch of the individual blades.

Such an adjustment enables the homogenization of the passage section of the turbine stator, to the benefit of the turbine's efficiency and, more generally, that of the turbomachine.

Such an adjustment can be made at any time during the life of the motor, for example when the motor is fitted or when the motor is serviced.

Such a positioning of the axis of rotation Y enables generally the optimization of the passage section of the turbine stator.

The example shown is by no means restrictive, the turbine stator 4 (or the sector 6) according to the invention could be installed in the low-pressure turbine of the turbomachine 1.

By convention in this application, "axial" or "axially" means any direction parallel to the axis X, and "radial" or "radially" means any direction perpendicular to the axis X.

Furthermore, by convention in the present application, the terms "inner" and "outer" are defined radially with respect to the axis X.

The outer and inner platforms 7, 8 delimit a duct 10 into which the gases resulting from the combustion of the air/fuel mixture flow. By convention, in the present application, the terms "upstream" and "downstream" are defined in relation to the direction of flow of the gases in the turbomachine 1.

As illustrated in the figures, the outer and inner platforms 7, 8 are each in the form of an arc of a circle about the axis X. Each sector 6 comprises two variable pitch blades 9, each of the blades 9 being adjustable about its axis of rotation Y. The axis of rotation Y of a blade is substantially radial. The pitch of a blade 9 is generally quantified by a pitch angle. Adjustment of the pitch of the blades 9 may be independent or common, in other words the blades 9 may be adjusted independently of each other, or in common. The pitch of the blades 9 can be adjusted manually or automatically. In the case of automatic adjustment, the turbine stator 4 comprises a control device comprising, for example, one or more actuators and one or more mechanisms, the mechanism or mechanisms connecting the actuator or the actuators to the blades 9. The pitch of the blades 9 are adjusted when the engine is at a standstill, for example during mounting or maintenance.

As indicated above, each blade 9 comprises an aerodynamic body 11 delimited radially by a head 12 and a root 13. The head 12 is placed with a first functional clearance in an opening 14 of the outer platform 7 and the root 13 is placed with a second functional clearance in a cavity 15 of the inner platform 8. The first and second functional clearances are positive and dimensioned to allow adjustment of the pitch over a predetermined range (for example plus or minus five degrees with respect to a reference position).

As indicated above, the axis of rotation Y of each blade 9 is located downstream of its head 12 and its root 13.

Figure 4:
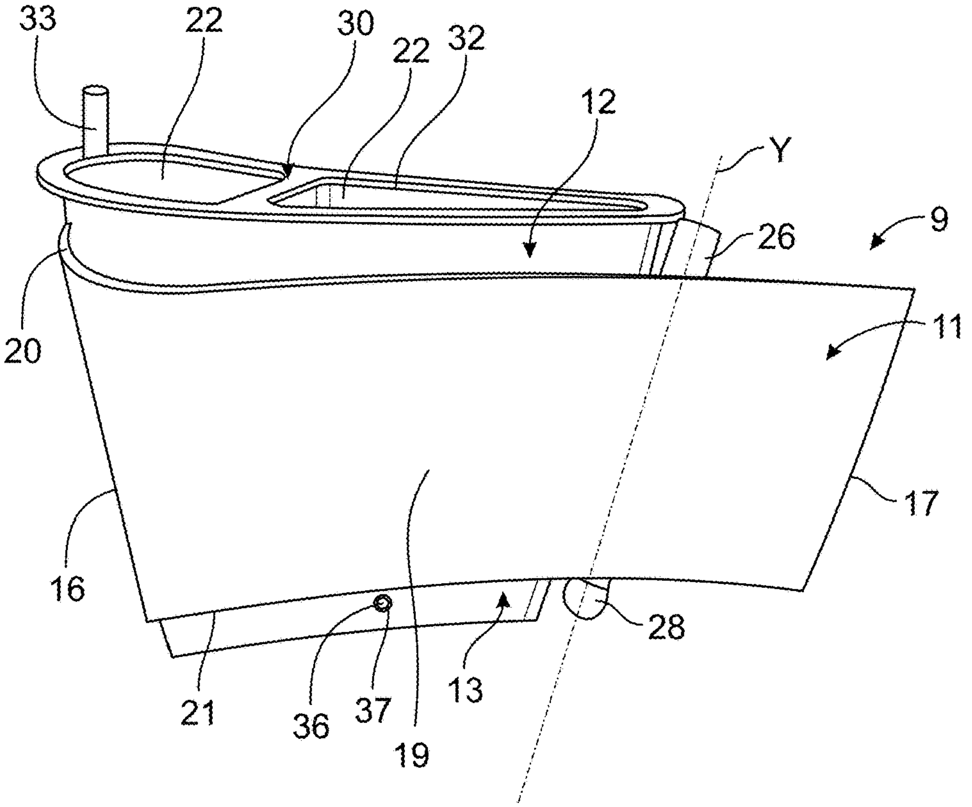
FIG. 4 is a first detail and perspective view of a blade of the sector illustrated in FIG. 2.
Figure 5:
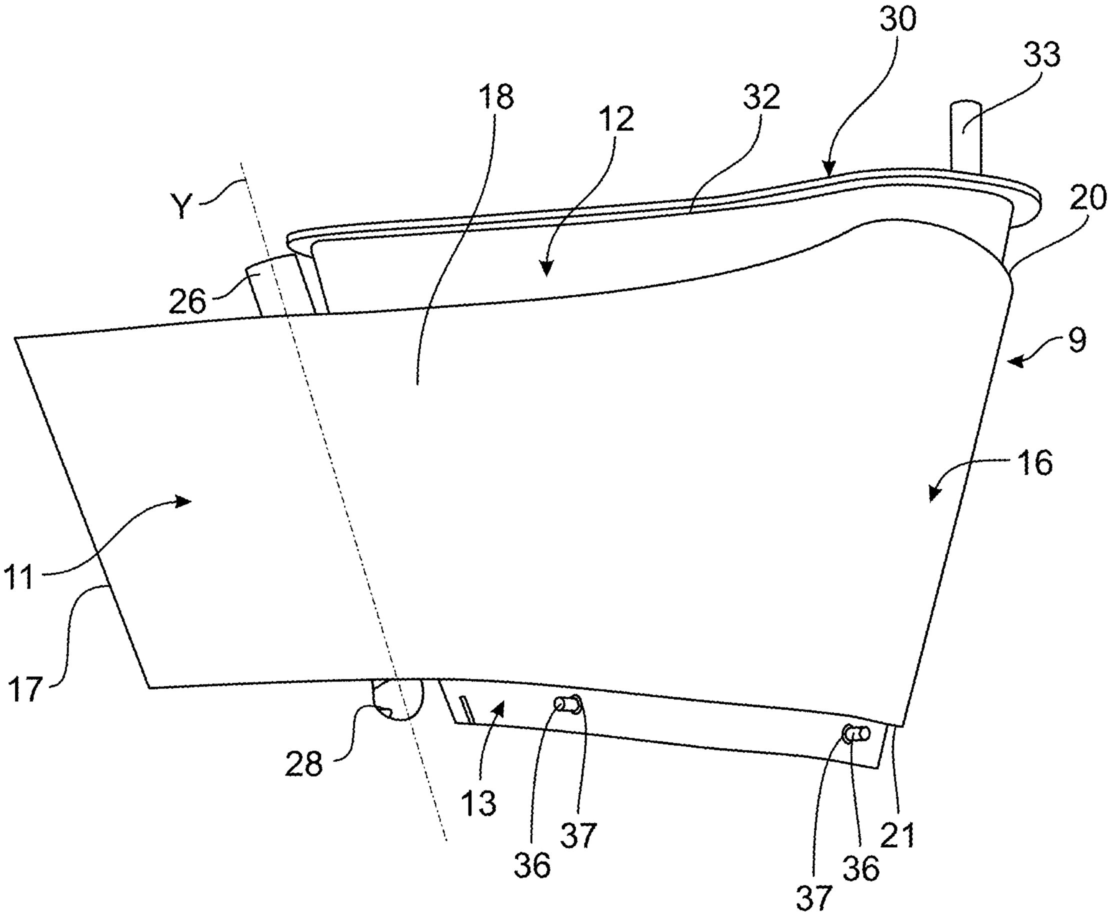
FIG. 5 is a second detail and perspective view of a blade of the sector illustrated in FIG. 2.

As illustrated in FIGS. 4 and 5, the body 11 of each blade 9 is delimited transversely by a leading edge 16 and a trailing edge 17, the leading edge 16 being arranged upstream of the trailing edge 17 in the direction of flow of the gases around the blade 9. The leading and trailing edges 16, 17 are connected to each other by a pressure side face 18 and a suction side face 19 of the body 11, these pressure and suction side faces 18, 19 being curved and concave and convex respectively.

The head 12 of each blade 9 has a contour or profile similar to that of the body 11, with reduced dimensional characteristics. The head 12 extends radially in line with the body 11 and is surrounded by a shoulder 20. Each opening 14 in the outer platform 7 is continuous and has a contour or profile similar to that of the head 12, with increased dimensional characteristics.

The root 13 of each blade 9 has a contour or profile similar to that of the body 11, with reduced dimensional characteristics. The root 13 extends radially in line with the body 11 and is surrounded by a shoulder 21. Each cavity 15 of the inner platform 8 is blind and has a contour or profile similar to that of the root 13, with increased dimensional characteristics.

Figure 14:
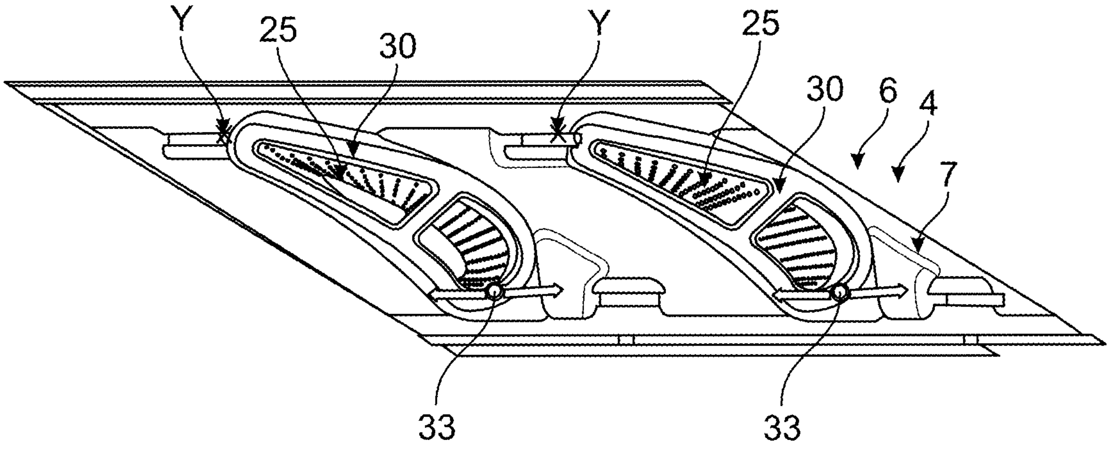
FIG. 14 is a top view illustrating a step of a method of mounting or maintaining a turbine stator according to the invention.

As illustrated in the figures, and in particular the FIGS. 4, 5, 11 and 14, in order to cope with the high temperatures of the surrounding space, each blade 9 is hollow and comprises two inner chambers 22 separated by a partition 23. These chambers 22 are fed by a flow of air which bypasses the combustion chamber 2, the flow of air being discharged from the chambers 22 through perforations 24 made in the body 11 of the blade 9, so as to join the flow of gas circulating in the duct 10. To optimize air flow distribution, a perforated jacket 25 is fitted in each of the chambers 22 (FIG. 14).

Advantageously, each blade 9 is guided in rotation about its axis of rotation Y via a cylindrical portion 26 of the blade 9 which is inserted in an orifice 27 of the outer platform 7 and a spherical portion 28 of the blade 9 which is inserted in a housing 29 of the inner platform 8. The cylindrical and spherical portions 26, 28 define the axis of rotation Y of the blade 9.

The spherical part ensures guidance while providing the additional degrees of freedom needed to cope with the deformations caused by thermal expansion, so as to prevent the blade 9 from seizing in rotation.

As shown in FIGS. 4 and 5, the cylindrical portion 26 is located directly downstream of the head 12 and projects outwards from the body 11. The spherical portion 28 is located directly downstream of the root 13 and projects inwards from the body 11.

A bearing can be inserted between the cylindrical portion 26 and the orifice 27, to optimize the rotational guidance of the blade 9. Similarly, a bearing can be inserted between the spherical portion 28 and the housing 29. Advantageously, the pitch of each blade 9 is adjusted via a control element 30 which is integral with the blade 9 and which is arranged outside the outer platform 7. The control element 30 is guided by a guide device 31 placed between the control element 30 and the outer platform 7.

Advantageously, the guide device 31 comprises an armature 34 in which bearing balls 35 and/or a self-lubricating pad are housed. A self-lubricating pad is for example made of sintered metal (e.g. bronze) and comprises pores incorporating lubricant (e.g. oil).

As illustrated in the figures, the control element 30 is in the form of a flange 30 whose contour or profile is similar to that of the head 12 (or opening 14). The flange 30 is attached to a free outer face 32 of the head 12 of the blade 9, for example by brazing. The flange 30 is perforated to allow air to be supplied to the inner chambers 22. The flange 30 comprises a finger 33 which can be used as a handle when adjustment is manual and independent, or as a link interface when adjustment is common and carried out by a control device.

As illustrated in the figures, the guide device 31 borders the opening 14 and comprises an armature 34 in which bearing balls 35 are housed. The bearing balls 35 are evenly distributed in the armature 34, so as to guide the flange 30 in a uniform manner. The guide device 31 is attached to the outer platform 7 and inserted between the flange 30 and the outer platform 7. Attaching the flange 30 ensures that the blade 9 is held radially with respect to the outer platform 7.

Advantageously, the root 13 of each blade 9 is held radially in the corresponding cavity 15 by several pins 36, each pin 36 being partly housed in a hole 37 in the root 13 and partly housed in a groove 38 in the cavity 15.

Figure 11:
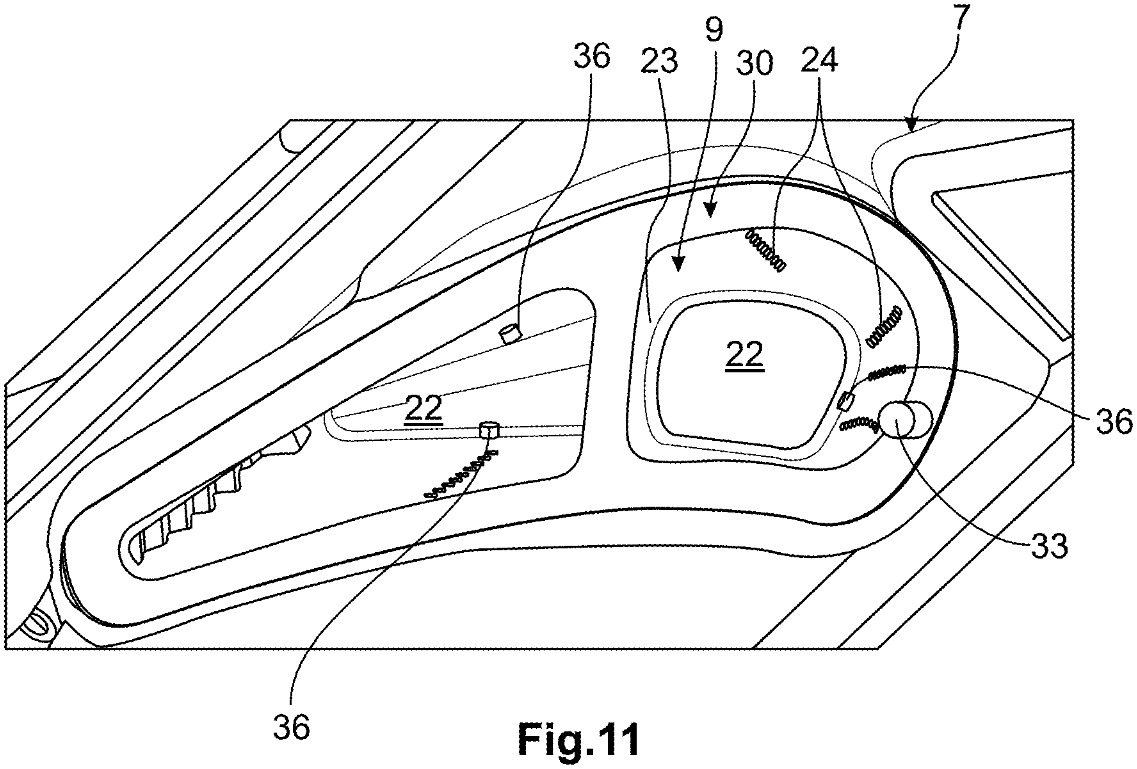
FIG. 11 is a perspective view illustrating a fifth step of the method of mounting the sector illustrated in FIG. 2.
Figure 12:
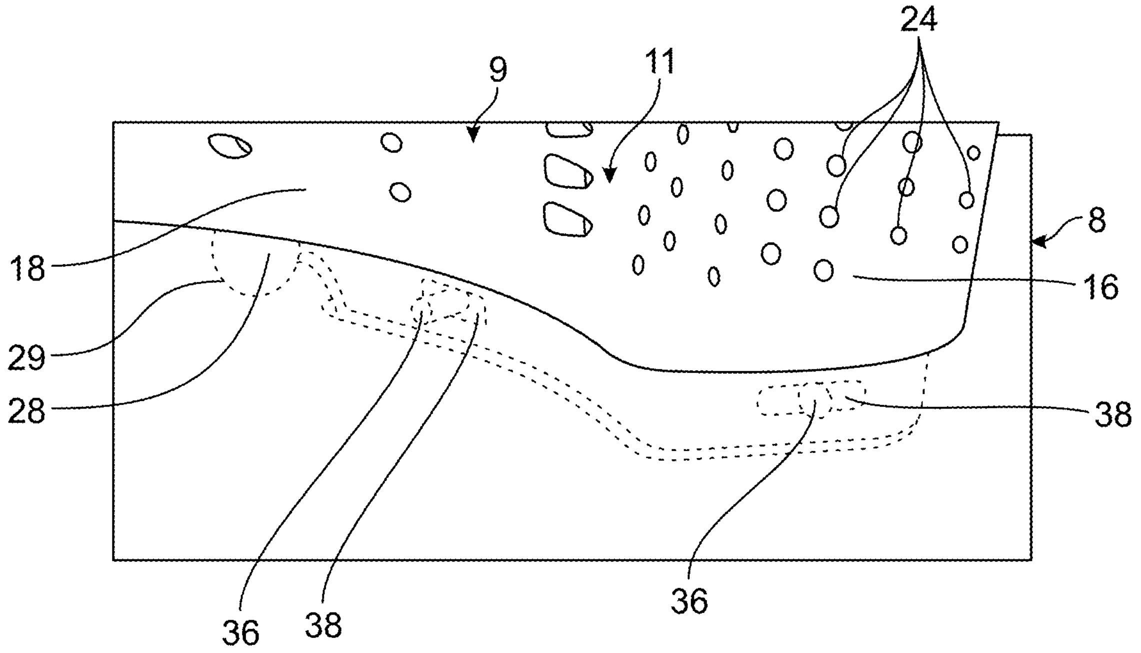
FIG. 12 is a first detail and perspective view of the fifth step.
Figure 13:
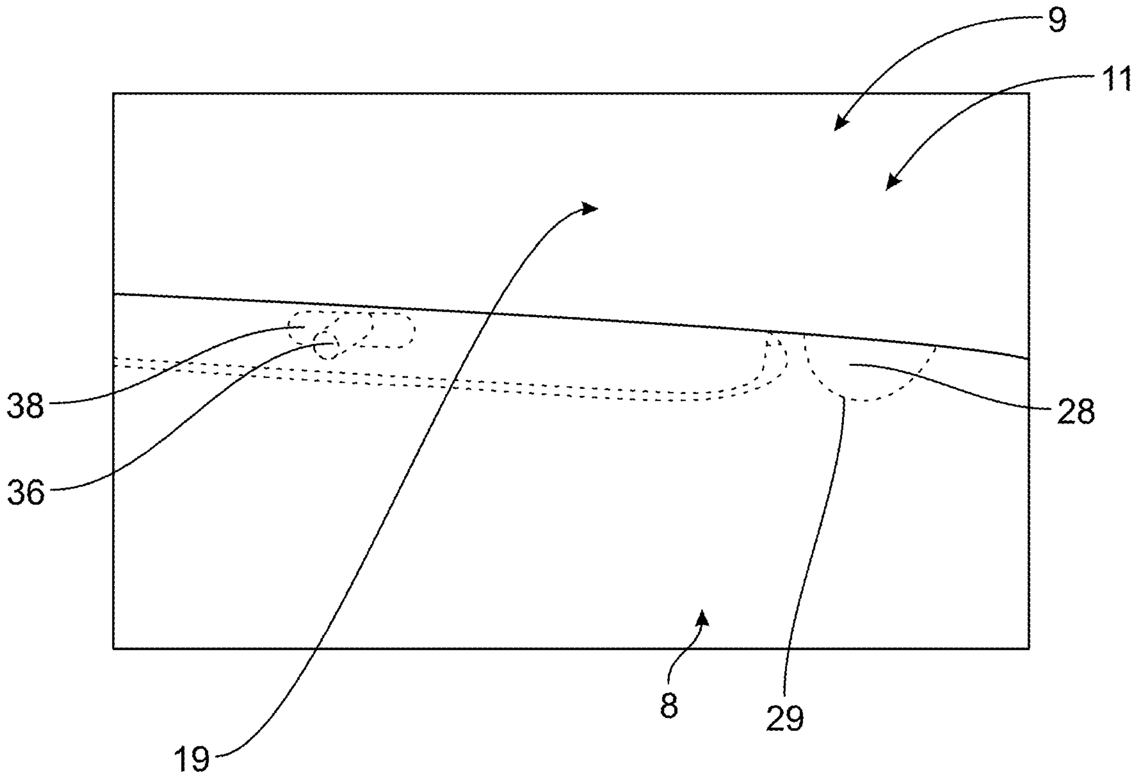
FIG. 13 is a second detail and perspective view of the fifth step.

As illustrated in the figures and in particular FIGS. 11 to 13, the root 13 of each blade 9 is held radially in the corresponding cavity 15 by three pins 36 distributed, namely a first pin 36 at the leading edge 16, a second pin 36 at the pressure side face 18, and a third pin 36 at the suction side face 19. The pins 36 are inserted through the inner chambers 22 and attached to the blade 9, for example by brazing. The grooves 38 made in cavity 15 are oblong and dimensioned to allow adjustment of the pitch over a predetermined range (for example plus or minus five degrees relative to a reference position). As illustrated in FIG. 1, the outer platform 7 of each sector 6 comprises an upstream sealing system 39 configured to come into axial abutment with an outer wall 40 of the combustion chamber 2, and a downstream sealing system 41 configured to come into axial abutment with a turbine casing 42. The inner platform 8 of each sector 6 comprises an upstream sealing system 43 configured to come into axial abutment with an inner wall 44 of the combustion chamber 2, and two attaching lugs 45 configured to be secured to a casing 46 surrounding the combustion chamber 2.

The turbine stator 4 also comprises one or more sealing plates (not shown) between two directly adjacent sectors 6 at the outer and inner platforms 7, 8 so as to minimize intersector leakage.

Figure 6:
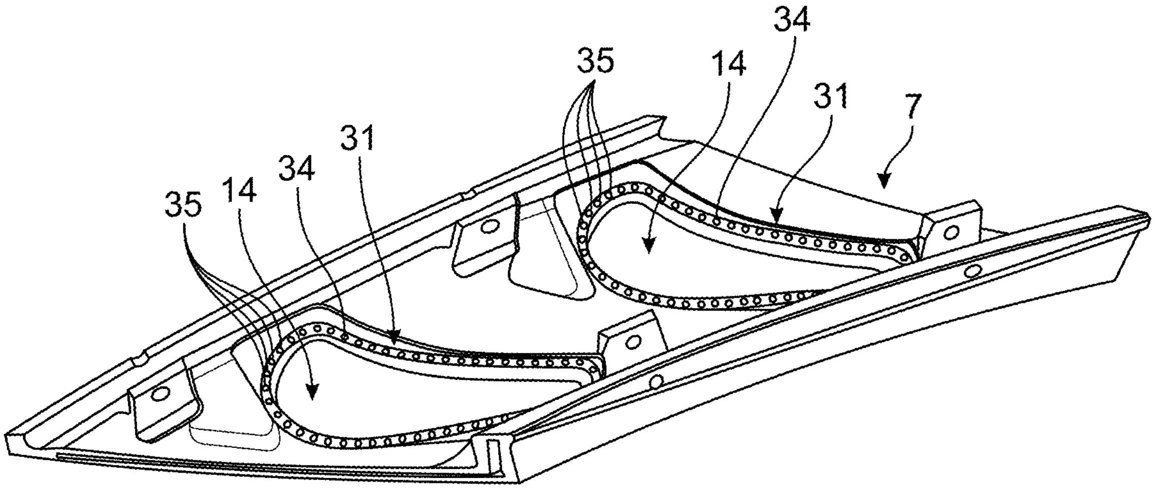
FIG. 6 is a perspective view illustrating a first step in a method of mounting the sector illustrated in FIG. 2.
Figure 7:
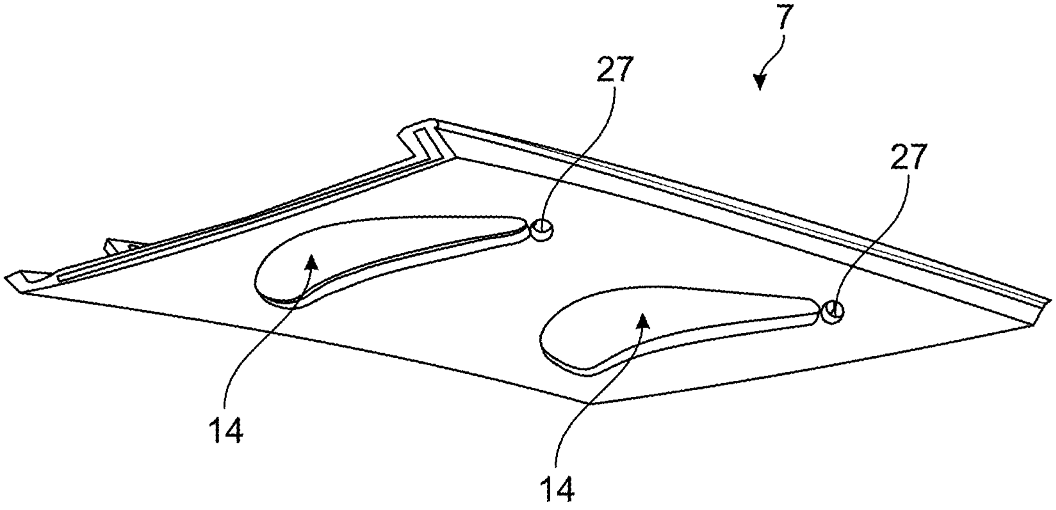
FIG. 7 is a detailed perspective view of the first step.
Figure 8:
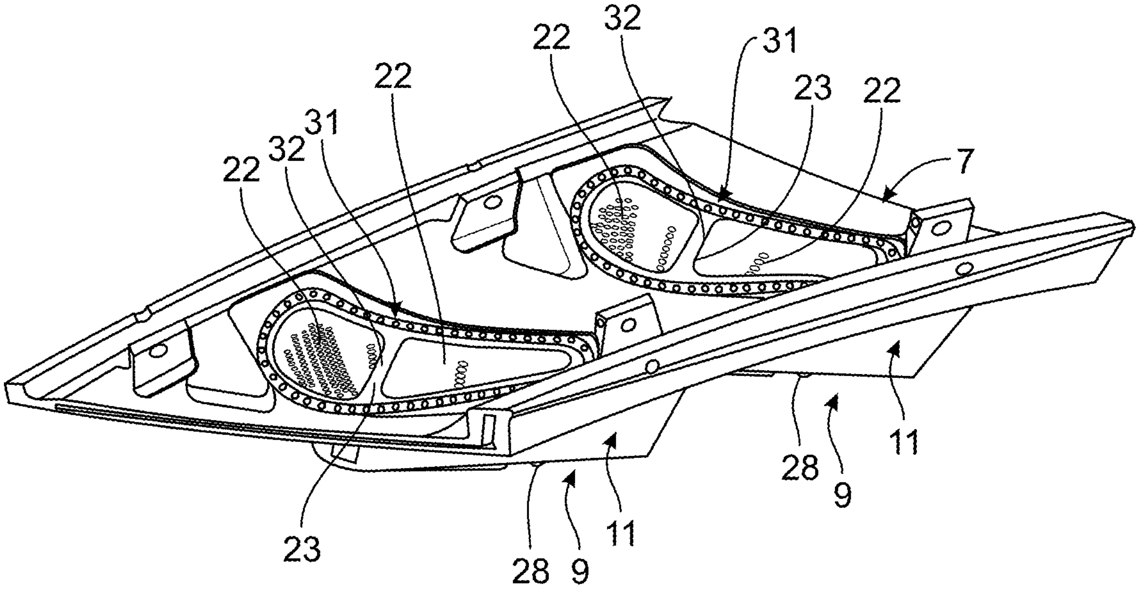
FIG. 8 is a perspective view illustrating a second step of the method of mounting the sector illustrated in FIG. 2.
Figure 9:
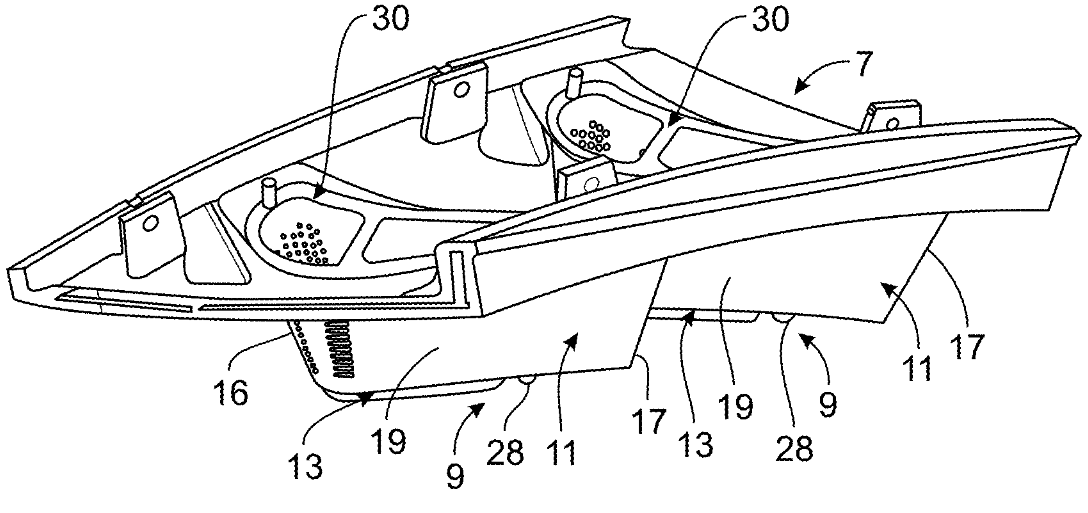
FIG. 9 is a perspective view illustrating a third step of the method of mounting the sector illustrated in FIG. 2.
Figure 10:
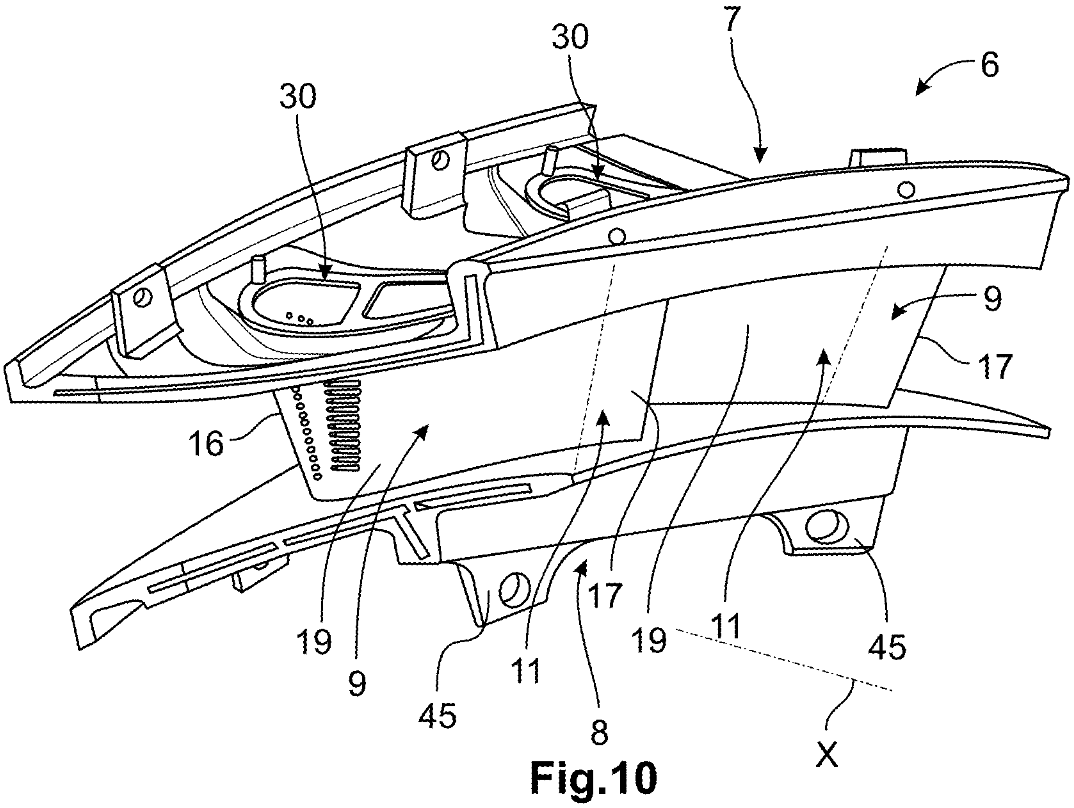
FIG. 10 is a perspective view illustrating a fourth step of the method of mounting the sector illustrated in FIG. 2.

For reasons of clarity, the various sealing systems 39, 41 and 43 are not shown in FIGS. 2 to 15. The blades 9 or the outer and inner platforms 7, 8 of a sector 6 have complex shapes, these parts can for example be manufactured using an additive manufacturing method (for example by selective fusion on a powder bed) or using a lost wax casting method. A sector 6 as illustrated in the figures and as previously described is mounted by an mounting method comprising the steps of:

a) bringing a guide device 31 to the outer platform 7, for each of the blades 9; (FIGS. 6 and 7)

b) placing the head 12 of the blade 9 together in an opening 14 of the outer platform 7 and the associated cylindrical portion 26 in an orifice 27 of the outer platform 7, for each of the blades 9; (FIG. 8)

c) attaching a flange 30 to the outer face 32 of the head 12 of the blade 9, for each of the blades 9; (FIG. 9)

d) placing the roots 13 of the blades 9 together in the cavities 15 of the inner platform 8 and the associated spherical portions 28 in the housings 29 of the inner platform 8; (FIG. 10)

e) inserting each of the three pins 36 into a hole 37 in the root 13 of the blade 9 and into an associated groove 38, for each of the blades 9; (FIGS. 11-13)

f) attaching the three pins 36 to the blade 9, for each of the blades 9;

g) mounting the upstream and downstream sealing systems 39, 41 on the outer platform 7, and the upstream sealing system 43 on the inner platform 8.

Step a) can be carried out by brazing or welding the armature 34 to the outer platform 7.

Step c) can be carried out by brazing or welding the flange 30 to the head 12 of the blade 9.

In step e), the pins 36 are inserted through the inner chambers 22.

Step f) can be carried out by brazing or welding the pins 36 to the inner surfaces defining the chambers 22, the brazing or welding being carried out in the inner chambers 22.

Figure 15:
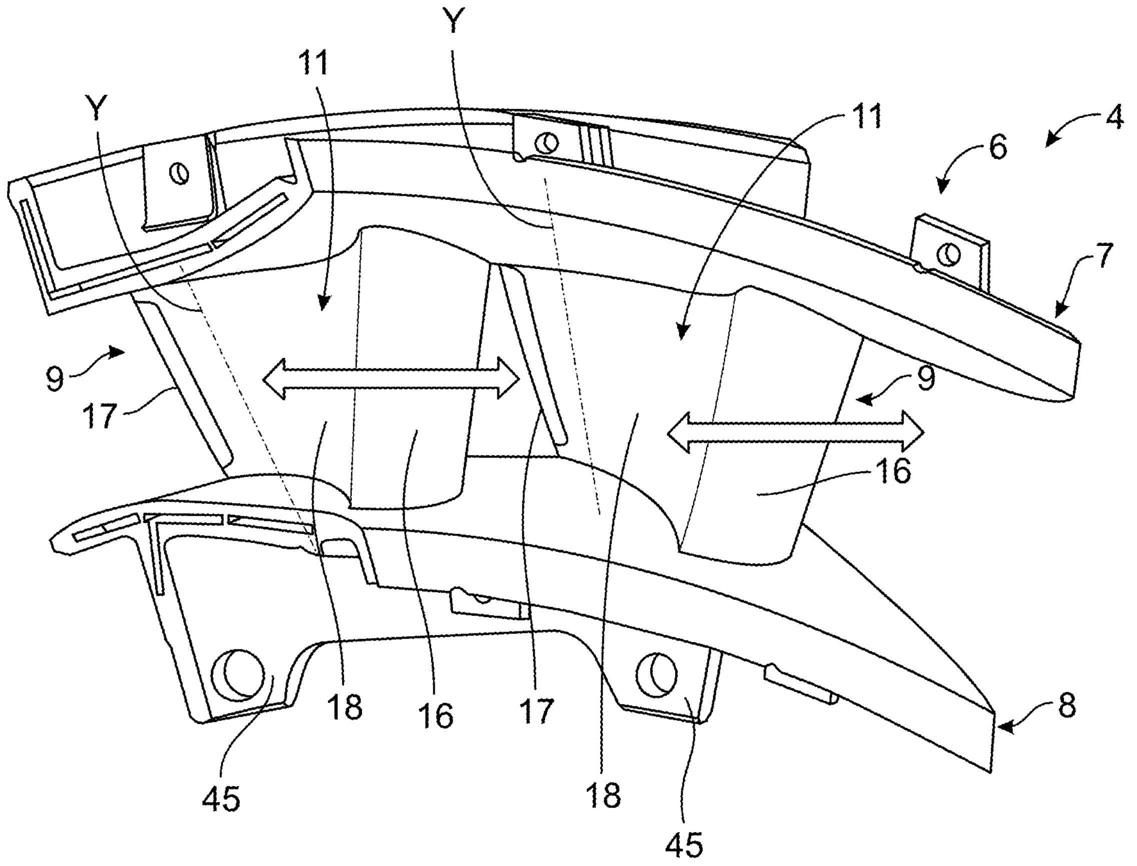
FIG. 15 is a front view of the step illustrated in FIG. 14.

The turbine stator 4 as described above is mounted by a mounting method comprising at least the step of:

a1) adjusting the pitch of the blades 9 of the sectors 6, so as to homogenize the passage section of passage of the turbine stator 4, which is defined between the outer and inner platforms 7, 8 of the sectors 6 (FIGS. 14 and 15).

Prior to step a1), the sectors 6 of the turbine stator 4 can be placed end-to-end around the axis X. As illustrated in FIG. 14 by the arrows, in step a1), the finger 33 of each blade 9 is actuated in a tangential or circumferential direction (in either direction), so as to adjust the pitch of the blade 9. The turbine stator 4 as described above is maintained by a maintenance method comprising at least the step of:

a1) adjusting the pitch of the blades 9 of the sectors 6, so as to homogenize the passage section of passage of the turbine stator 4, which is defined between the outer and inner platforms 7, 8 of the sectors 6 (FIGS. 14 and 15).

As illustrated in FIG. 14 by the arrows, in step a1), the finger 33 of each blade 9 is actuated in a tangential or circumferential direction (in either direction), so as to adjust the pitch of the blade 9. For reasons of clarity, only one sector 6 of the turbine stator 4 is shown in FIGS. 14 and 15.

The invention claimed is:

1. A sector of a turbine stator for a turbine of an aircraft turbomachine, the sector comprising:

an outer platform and an inner platform which are coaxial along an axis; and at least one blade which connects the outer and inner platforms together, wherein the at least one blade is of variable pitch about an axis of rotation of the at least one blade, the at least one blade comprising an aerodynamic body delimited radially by a head and a root, wherein the head is placed with a first functional clearance in an opening in the outer platform, wherein the root is placed with a second functional clearance in a cavity of the inner platform, and wherein the axis of rotation of the at least one blade is located downstream of the head and the root.

2. The sector according to claim 1, wherein the at least one blade is guided in rotation about its axis of rotation via:

a cylindrical portion of the at least one blade which is inserted in an orifice of the outer platform; and a spherical portion of the at least one blade which is inserted in a housing of the inner platform.

3. The sector according to claim 1, wherein the pitch of the at least one blade is adjusted via a control element which is integral with the at least one blade and which is disposed outside the outer platform, wherein the control element is guided by a guide device placed between the control element and the outer platform.

4. The sector according to claim 3, wherein the control element is attached to an outer face of the head of the at least one blade.

5. The sector according to claim 3, wherein the guide device comprises an armature in which bearing balls and/or a self-lubricating pad are housed.

6. The sector according to claim 1, wherein the root of the at least one blade is held radially in the cavity by a plurality of pins, each pin being partly housed in a hole in the root and partly housed in a groove of the cavity.

7. The sector according to claim 1, wherein the sector comprises several blades each of which connects the outer and inner platforms, each of the several blades being of variable pitch about its axis of rotation.

8. A turbine stator for a turbine of an aircraft turbomachine, the turbine stator comprising a plurality of sectors according to claim 1, the sectors being placed end-to-end about the axis.

9. A turbine of an aircraft turbomachine comprising a turbine stator according to claim 8.

10. An aircraft turbomachine comprising a turbine according to claim 9.

11. An aircraft turbomachine comprising a turbine stator according to claim 8.

12. A method of mounting or maintaining a turbine stator according to claim 8, the method comprising at least the step of:

adjusting the pitch of the at least one blade of the sectors so as to homogenize the passage section of the turbine stator, which is defined between the outer and inner platforms of the sectors.

* * * * *